(12) United States Patent
Zhang

(10) Patent No.: US 12,275,314 B2
(45) Date of Patent: Apr. 15, 2025

(54) TRACTION BATTERY PACK HAVING COMPARTMENTALIZED BATTERY ARRAYS AND THERMAL MANAGEMENT METHOD FOR SAME

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 18/067,835

(22) Filed: Dec. 19, 2022

(65) Prior Publication Data

US 2024/0198818 A1   Jun. 20, 2024

(51) Int. Cl.
| | | |
|---|---|---|
| *B60L 50/64* | (2019.01) | |
| *B60L 58/26* | (2019.01) | |
| *B60L 58/27* | (2019.01) | |
| *H01M 10/613* | (2014.01) | |
| *H01M 10/615* | (2014.01) | |
| *H01M 10/625* | (2014.01) | |
| *H01M 10/6566* | (2014.01) | |

(52) U.S. Cl.
CPC .............. *B60L 50/64* (2019.02); *B60L 58/26* (2019.02); *B60L 58/27* (2019.02); *H01M 10/613* (2015.04); *H01M 10/615* (2015.04); *H01M 10/625* (2015.04); *H01M 10/6566* (2015.04); *H01M 2220/20* (2013.01)

(58) Field of Classification Search
CPC .......... B60L 50/64; B60L 58/26; B60L 58/27; H01M 10/6566; H01M 10/613; H01M 10/625; H01M 10/6556; H01M 10/6563; H01M 50/209; H01M 50/244; H01M 50/249; H01M 2220/20; B60H 1/00278
See application file for complete search history.

(56) References Cited

U.S. PATENT DOCUMENTS

| | | | |
|---|---|---|---|
| 11,217,857 B2 | 1/2022 | Lindstrom et al. | |
| 2016/0093929 A1* | 3/2016 | Obasih .............. | H01M 10/6551 429/120 |
| 2017/0008407 A1* | 1/2017 | Porras ..................... | B60L 58/26 |
| 2017/0125865 A1* | 5/2017 | Mascianica ....... | H01M 10/6567 |
| 2017/0288186 A1 | 10/2017 | Kruger et al. | |
| 2022/0052414 A1 | 2/2022 | Huang et al. | |
| 2022/0169394 A1 | 6/2022 | Ynn et al. | |

* cited by examiner

*Primary Examiner* — Henry T Crenshaw
*Assistant Examiner* — Kamran Tavakoldavani
(74) *Attorney, Agent, or Firm* — David B. Kelley; Carlson, Gaskey & Olds, P.C.

(57) ABSTRACT

A traction battery pack assembly includes an enclosure having compartments and battery arrays. Each battery array is disposed in one of the compartments. An intake manifold delivers air to the compartments. An exhaust manifold receives air from the compartments. A thermal management method includes using an intake manifold to deliver air to compartments within an enclosure. The compartments each house at least one battery array. The method includes using an exhaust manifold to receive air from the compartments and to communicate air from the enclosure.

16 Claims, 3 Drawing Sheets

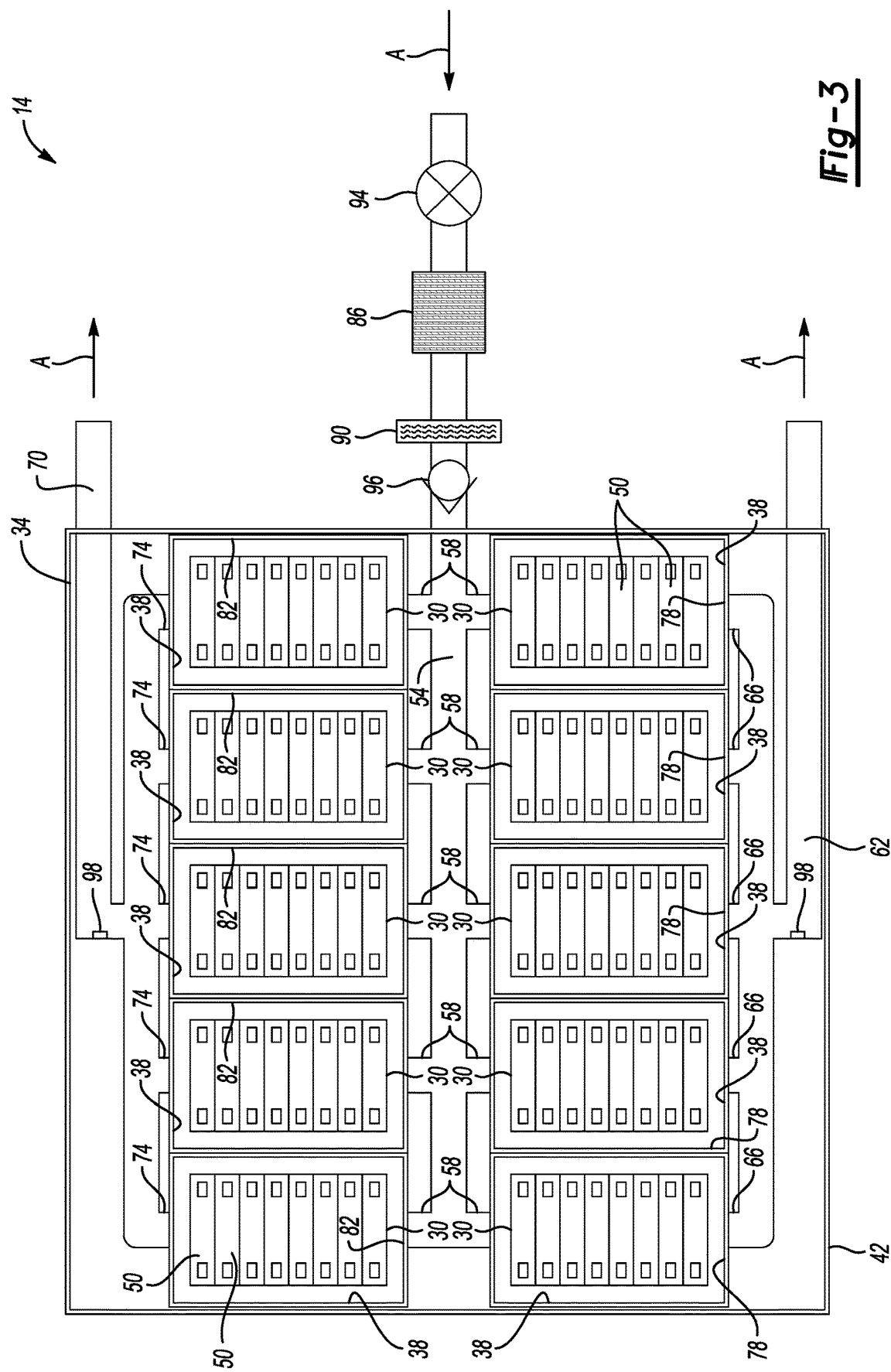

TRACTION BATTERY PACK HAVING COMPARTMENTALIZED BATTERY ARRAYS AND THERMAL MANAGEMENT METHOD FOR SAME

TECHNICAL FIELD

This disclosure relates generally to a traction battery pack that includes compartmentalized battery arrays and, more particularly, to managing thermal energy levels of such a traction battery pack.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack assembly can power the electric machines. The traction battery pack assembly of an electrified vehicle can include groups of battery cells.

SUMMARY

In some aspects, the techniques described herein relate to a traction battery pack assembly, including: an enclosure having a plurality of compartments; a plurality of battery arrays, each battery array disposed in a compartment within the plurality of compartments; an intake manifold that delivers air to the plurality of compartments; and an exhaust manifold that receives air from the plurality of compartments.

In some aspects, the techniques described herein relate to an assembly, further including a plurality of intake runners and a plurality of exhaust runners, each intake runner within the plurality of intake runners fluidly coupling the intake manifold to one of the compartments within the plurality of compartments, each exhaust runner within the plurality of exhaust runners fluidly coupling the one of the compartments within the plurality of compartments to the exhaust manifold.

In some aspects, the techniques described herein relate to an assembly, wherein the plurality of compartments includes a plurality of first compartments, and exhaust manifold is a first exhaust manifold, and further including a plurality of second compartments and a second exhaust manifold, the intake manifold configured to deliver air to both the first and plurality of second compartments, the first exhaust manifold configured to receive air from the plurality of first compartments, the second exhaust manifold configured to receive air from the plurality of second compartments.

In some aspects, the techniques described herein relate to an assembly, wherein the intake manifold extends between the plurality of first compartments and the plurality of second compartments.

In some aspects, the techniques described herein relate to an assembly, wherein the plurality of first compartments are disposed between the intake manifold and the first exhaust manifold on a first side of the enclosure, wherein the plurality of second compartments are disposed between the intake manifold and the first exhaust manifold on an opposite, second side of the enclosure.

In some aspects, the techniques described herein relate to an assembly, further including a chiller configure to cool air that is moved through the intake manifold to the plurality of compartments.

In some aspects, the techniques described herein relate to an assembly, further including a heater configured to heat air that is moved through the intake manifold to the plurality of compartments.

In some aspects, the techniques described herein relate to an assembly, wherein each of the compartments within the plurality of compartments is fluidly isolated from the other compartments within the plurality of compartments.

In some aspects, the techniques described herein relate to an assembly, further including a check valve disposed in the intake manifold, the check valve configured to permit air to flow to the plurality of compartments and to block flow from the plurality of compartments to the intake manifold.

In some aspects, the techniques described herein relate to a thermal management method, including: using an intake manifold to deliver air to a plurality of compartments within an enclosure, the plurality of compartments each housing at least one battery array; and using an exhaust manifold to receive air from the plurality of compartments and to communicate air from the enclosure.

In some aspects, the techniques described herein relate to a thermal management method, further including connecting the intake manifold to the plurality of compartments using a plurality of intake runners, and connecting the exhaust manifold to the plurality of compartments using a plurality of exhaust runners.

In some aspects, the techniques described herein relate to a thermal management method, wherein the exhaust manifold is a first exhaust manifold and the plurality of compartments is a plurality of first compartments within the enclosure, and further including using a second exhaust manifold to receive air from a plurality of second compartments within the enclosure.

In some aspects, the techniques described herein relate to a thermal management method, wherein the intake manifold extends between the plurality of first compartments and the plurality of second compartments.

In some aspects, the techniques described herein relate to a thermal management method, wherein the plurality of first compartments are disposed between the intake manifold and the first exhaust manifold on a first side of the enclosure, wherein the plurality of second compartments are disposed between the intake manifold and the first exhaust manifold on an opposite, second side of the enclosure.

In some aspects, the techniques described herein relate to a thermal management method, further including, adjusting a temperature of air delivered through the intake manifold based, at least in part, on a temperature of air communicated through at least one of the compartments.

In some aspects, the techniques described herein relate to a thermal management method, further including, under first operating conditions, heating air that is delivered to the plurality of compartments, and under second operating conditions, cooling air that is delivered to the plurality of compartments.

In some aspects, the techniques described herein relate to a thermal management method, wherein the first and second operating conditions are based, at least in part, on a temperature of air communicated through at least one of the compartments.

In some aspects, the techniques described herein relate to a thermal management method, wherein the temperature of air communicated through at least one of the compartments is monitored within the exhaust manifold. 19.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 3 illustrates a top view of the traction battery pack of FIG. 2.

DETAILED DESCRIPTION

This disclosure details a traction battery pack assembly having battery arrays disposed in compartments within an enclosure. Air is selectively moved through the compartments to heat or cool the battery arrays.

Figure 1:
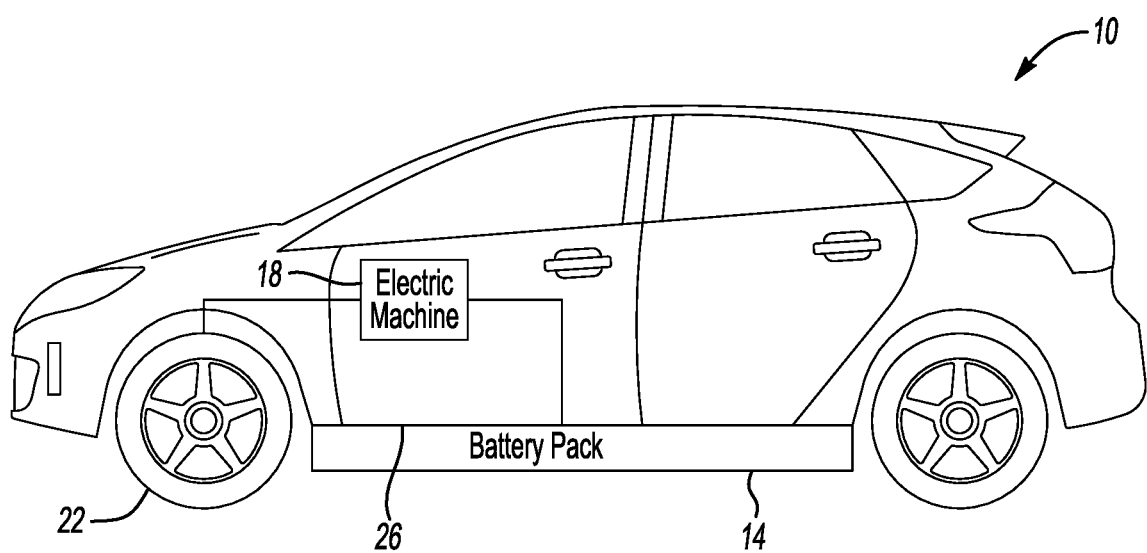
FIG. 1 illustrates a side view of an example electrified vehicle having a traction battery pack.

With reference to FIG. 1, an electrified vehicle 10 includes a traction battery pack assembly 14, an electric machine 18, and wheels 22. The traction battery pack assembly 14 powers an electric machine 18, which can convert electrical power to mechanical power to drive the wheels 22. The traction battery pack assembly 14 can be a relatively high-voltage battery.

The traction battery pack assembly 14 is, in the exemplary embodiment, secured to an underbody 26 of the electrified vehicle 10. The traction battery pack assembly 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a traction battery pack.

Figure 2:
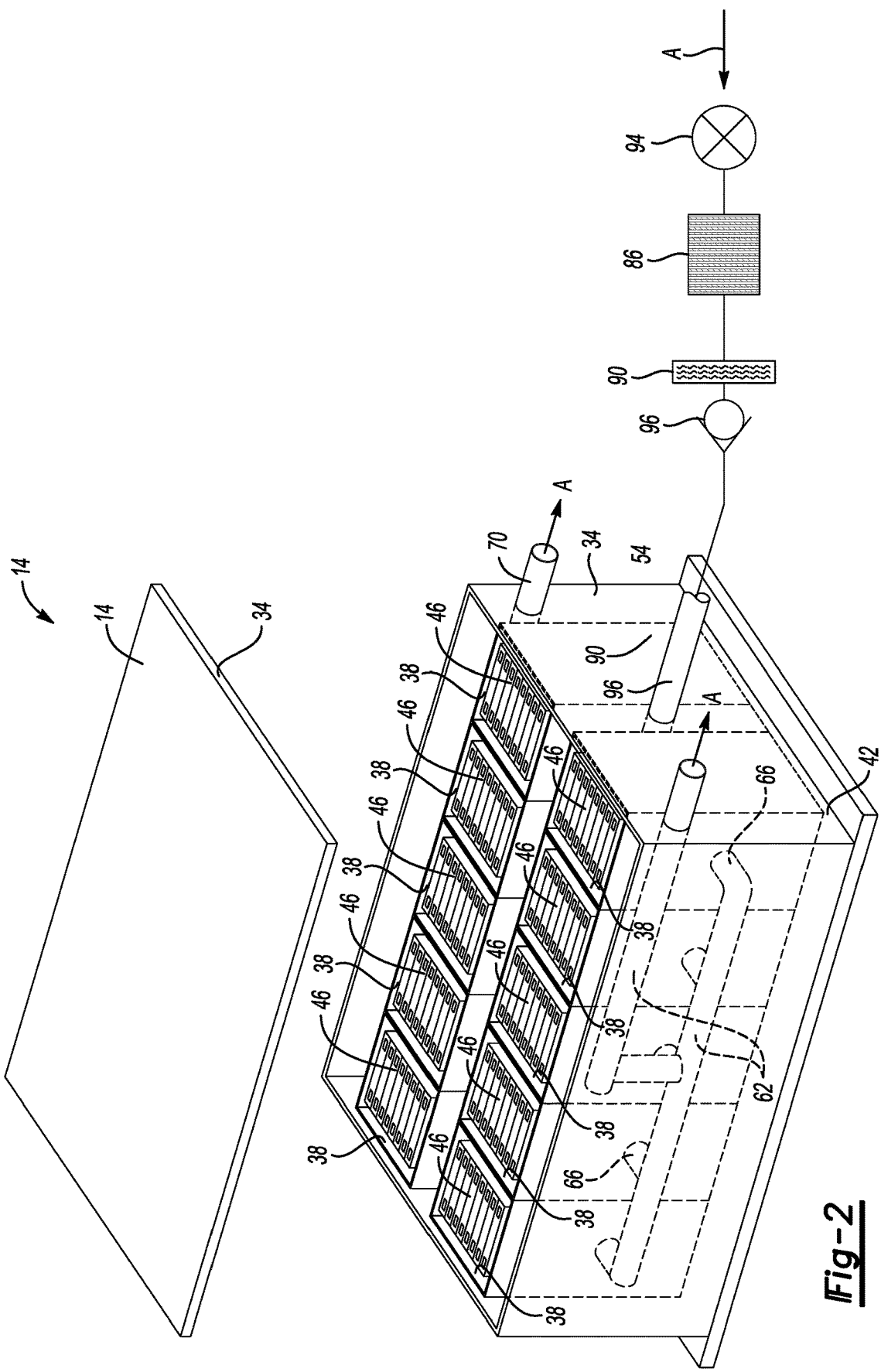
FIG. 2 illustrates a perspective, partially schematic view of the traction battery pack of FIG. 1.

With reference now to FIGS. 2 and 3, the traction battery pack assembly 14 includes an enclosure assembly 34 having a plurality of compartments 38. In the exemplary embodiment, the enclosure assembly 34 includes an enclosure cover 40 and an enclosure tray 42. The enclosure cover 40 is secured to the enclosure tray 42.

A plurality of battery arrays 46 are housed within the enclosure assembly 34. The battery arrays 46 each include a plurality of individual battery cells 50. In this example, ten battery arrays 46 are housed within the enclosure assembly 34. Other numbers of battery arrays 46 could be housed within the enclosure assembly 34 in other examples. That is, the enclosure assembly 34 could house more than ten battery arrays 46 or fewer than ten battery arrays 46.

In an embodiment, the battery cells 50 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

The battery arrays 46, in the exemplary embodiment each include eight individual battery cells 50, but more than eight or fewer than eight battery cells 50 could be included in other examples. For example, the battery arrays 46 could include forty individual battery cells 50 in another example.

From time to time, pressure and thermal energy within one or more of the battery cells 50 can increase. The pressure and thermal energy increase can be due to an overcharge condition, an overdischarging condition, or short circuit events, for example. The pressure and thermal energy increase can cause the associated battery cell 50 to rupture and release gas from within an interior of the associated battery cell 50 into the respective compartment 38.

The gases may be caused by an applied force or a thermal event, and can either cause or exacerbate an existing battery thermal event. A relatively significant amount of heat can be generated during battery thermal events.

In this example, each compartment 38 holds a single one of the battery arrays 46. The compartments 38 are fluidly isolated from one another. Thus, gas vented from one of the battery cells 50 in one of the battery arrays 46 cannot flow directly to another of the compartments 38. Permitting the gas vented from one of the battery cells 50 within one of the compartments 38 to move to near another of the battery arrays 46 could introduce thermal energy to the other battery array 46 and lead to a cascading thermal event. The compartments 38 are insulative to further help block transfer of thermal energy from one of the battery arrays 46 to another of the battery arrays 46.

The traction battery pack assembly 14 also includes an intake manifold 54, a plurality of intake runners 58, a first exhaust manifold 62, a plurality of first exhaust runners 66, a second exhaust manifold 70, and a plurality of second exhaust runners 74.

The intake manifold 54 delivers air A to the plurality of compartments 38. In particular, the intake manifold 54 delivers air A from outside the enclosure assembly 34 to the plurality of intake runners 58. Each of the intake runners 58 fluidly couples one of the compartments 38 to the intake manifold 54. The intake runners 58 connect the compartments 38 to the intake manifold.

The plurality of compartments 38 includes a plurality of first compartments 78 on a first side of the enclosure assembly 34 and a plurality of second compartments 82 on an opposite, second side of the enclosure assembly 34. The intake manifold 54 extends between the first compartments 78 and the second compartments 82. The intake runners 58 are disposed between first compartments 78 and the second compartments 82.

The first exhaust manifold 62 is on the first side of the enclosure assembly 34. The plurality of first compartments 78 are sandwiched between the first exhaust manifold 62 and the intake manifold 54. In particular, the plurality of first exhaust runners 66 each fluidly couple one of the plurality of first compartments 78 to the first exhaust manifold 62. After the air A moves over the respective battery array 46 within the respective first compartment 38, the first exhaust manifold 62 receives air A from the plurality of first compartments 78. Air A from the plurality of first compartments 78 is exhausted to the plurality of first exhaust runners 66 and then to the first exhaust manifold 62, which communicates the air A outside the enclosure assembly 34.

The second exhaust manifold 70 is on the second side of the enclosure assembly 34. The plurality of second compartments 82 are sandwiched between the second exhaust manifold 70 and the intake manifold 54. The second exhaust manifold 70 receives air A from the plurality of second compartments 82. In particular, the plurality of second exhaust runners 74 each fluidly couple one of the plurality of second compartments 82 to the second exhaust manifold 70. After the air A moves over the respective battery array 46 within the respective first compartment 38, air A from the plurality of second compartments 82 is exhausted to the second exhaust runners 74 and then to the second exhaust manifold 70, which communicates the air A outside the enclosure assembly 34.

The intake manifold 54 is thus configured to deliver air A to both the plurality of first compartments 78 and to the plurality of second compartments 82. The first exhaust manifold 62 receives air A from the plurality of first compartments 78, but not the plurality of second compartments 82.

The first exhaust manifold 62 and the second exhaust manifold 70 can mix the air A vented from the associated compartments 38, which can cool the air A prior to the air A exiting the enclosure assembly 34.

In this example, a chiller 86 is selectively used to cool air A that is communicated through the intake manifold 54, and a heater 90 is selectively used to heat air A that is communicated through the intake manifold 54. An air A pump 94 is used to force air A through the intake manifold 54. A one-way check valve 96 is used to block airflow from flowing out of the enclosure assembly 34 through the intake manifold 54.

The traction battery pack assembly 14 can include at least one temperature sensor 98 that monitor a temperature of air A moving though the first exhaust manifold 62, the second exhaust manifold 70, or both. The temperature can be measured within the first exhaust manifold 62, within the second exhaust manifold 70, or both.

Air in the first exhaust manifold 62 and in the second exhaust manifold 70 can be considered exhausted air. The at least one temperature sensor 98 can be said to monitor a temperature of exhausted air. An exemplary thermal management method used in connection with the traction battery pack assembly 14 adjusts a temperature of the air A delivered through the intake manifold 54 based on the temperature of the exhausted air.

The exemplary method can include, under first operating conditions, heating air A that is delivered to the plurality of compartments 38 through the intake manifold 54, and
under second operating conditions, cooling air A that is delivered to the plurality of compartments 38 through the intake manifold 54. Cooling air A using the chiller 86 and heating air A using the heater 90 can be based on the temperature of the exhausted air.

In an exemplary non-limiting example, the heater 90 and air A pump 94 are activated to move heated air A through the intake manifold 54 when the temperature sensor 98 detects that a temperature of the exhausted air A is less than or equal to 20 degrees Celsius. The heater 90 can be an electric heater. The chiller 86 is not activated when the temperature sensor 98 detects that the temperature of exhausted air A is less than or equal to 20 degrees. This operating condition could be associated within warming the traction battery pack assembly 14 during a cold start on a cold winter day.

If the temperature sensor 98 detects that the temperature of exhausted air A is above 20 degrees Celsius but less than or equal to 40 degrees Celsius, the air A pump 94, the chiller 86, and the heater 90 are deactivated.

If the temperature sensor 98 detects a temperature of the exhausted air A is above 40 degrees Celsius but less than or equal to 150 degrees Celsius, the air A pump 94 is activated to move air A through the intake manifold 54, but the chiller 86 and heater 90 are deactivated. This operating condition can provide a mild cooling of the traction battery pack assembly 14.

If the temperature sensor 98 detects a temperature of the exhausted air A is above 150 degrees, the chiller 86 and the air A pump 94 are activated to move cooled air A through the intake manifold 54. The heater 90 is not activated. This operating condition could correspond to a thermal event where at least one of the battery cells 50 is venting.

As can be appreciated, a control module of the vehicle 10 can automatically activate the chiller 86, the heater 90, and the pump 94 in response to the monitoring and comparison. The control module may include both hardware and software and could be part of an overall vehicle control system, such as a vehicle system controller (VSC), or could alternatively be a stand-alone controller separate from the VSC. In an embodiment, the control module is programmed with executable instructions for interfacing with and commanding operation of various components of the system. The control module may include a processor and non-transitory memory for executing various control strategies and modes. The processor can be a custom made or commercially available processor, a central processing unit (CPU), or generally any device for executing software instructions. The memory can include any one or combination of volatile memory elements and/or nonvolatile memory elements.

Features of the disclosed examples include an exhaust system comprises more than one exhaust manifold, which can help to eliminate the effect of high temperature gas vented from battery cells 50 in one of the arrays 46 from flowing over another of the arrays. During a venting event, the exhaust air A temperature can increase to above 150 degrees Celsius causing both the air A pump 94 and the chiller 86 to be activated. This pushes the vented gases to the associated first exhaust manifold 62 or second exhaust manifold 70, and out of the enclosure assembly 34.

The compartment design for each battery array facilitates guiding air over each array. An intake system can distribute cooled or warm air into each battery array. An exhaust system can expel and cool down an air/vent-gas mixture from the battery arrays.

Using more than one, here two, separate exhaust manifolds can increase thermal energy transfer surface area and flow mixing volume. The exhaust manifolds can be used as a flow mixer to cool down vent-gas before it exits the battery pack. The disclosed examples can quickly reduce vent-gas temperature by introducing flow mixing between vent-gas and cooled ambient air.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:
1. A traction battery pack assembly, comprising:
an enclosure having a plurality of compartments;
a plurality of battery arrays, each battery array disposed in a compartment within the plurality of compartments;
an intake manifold that delivers air to the plurality of compartments;
an exhaust manifold that receives air from the plurality of compartments; and
a plurality of intake runners and a plurality of exhaust runners, each intake runner within the plurality of intake runners fluidly coupling the intake manifold to one of the compartments within the plurality of compartments, each exhaust runner within the plurality of exhaust runners fluidly coupling the one of the compartments within the plurality of compartments to the exhaust manifold.

2. The assembly of claim 1, further comprising a chiller configure to cool air that is moved through the intake manifold to the plurality of compartments.

3. The assembly of claim 2, further comprising a heater configured to heat air that is moved through the intake manifold to the plurality of compartments.

4. The assembly of claim 1, wherein each of the compartments within the plurality of compartments is fluidly isolated from the other compartments within the plurality of compartments.

5. The assembly of claim 1, further comprising a check valve disposed in the intake manifold, the check valve configured to permit air to flow to the plurality of compartments and to block flow from the plurality of compartments to the intake manifold.

6. A traction battery pack assembly, comprising:
an enclosure having a plurality of compartments;
a plurality of battery arrays, each battery array disposed in a compartment within the plurality of compartments;
an intake manifold that delivers air to the plurality of compartments; and
an exhaust manifold that receives air from the plurality of compartments,
wherein the plurality of compartments includes a plurality of first compartments, and exhaust manifold is a first exhaust manifold, and further comprising a plurality of second compartments and a second exhaust manifold, the intake manifold configured to deliver air to both the first and plurality of second compartments, the first exhaust manifold configured to receive air from the plurality of first compartments, the second exhaust manifold configured to receive air from the plurality of second compartments.

7. The assembly of claim 6, wherein the intake manifold extends between the plurality of first compartments and the plurality of second compartments.

8. The assembly of claim 7, wherein the plurality of first compartments are disposed between the intake manifold and the first exhaust manifold on a first side of the enclosure, wherein the plurality of second compartments are disposed between the intake manifold and the first exhaust manifold on an opposite, second side of the enclosure.

9. A thermal management method, comprising:
using an intake manifold to deliver air to a plurality of compartments within an enclosure, the plurality of compartments each housing at least one battery array; and
using an exhaust manifold to receive air from the plurality of compartments and to communicate air from the enclosure,
wherein the exhaust manifold is a first exhaust manifold and the plurality of compartments is a plurality of first compartments within the enclosure, and further comprising using a second exhaust manifold to receive air from a plurality of second compartments within the enclosure.

10. The thermal management method of claim 9, further comprising connecting the intake manifold to the plurality of compartments using a plurality of intake runners, and connecting the exhaust manifold to the plurality of compartments using a plurality of exhaust runners.

11. The thermal management method of claim 10, wherein the intake manifold extends between the plurality of first compartments and the plurality of second compartments.

12. The thermal management method of claim 11, wherein the plurality of first compartments are disposed between the intake manifold and the first exhaust manifold on a first side of the enclosure, wherein the plurality of second compartments are disposed between the intake manifold and the first exhaust manifold on an opposite, second side of the enclosure.

13. The thermal management method of claim 9, further comprising, adjusting a temperature of air delivered through the intake manifold based, at least in part, on a temperature of air communicated through at least one of the compartments.

14. The thermal management method of claim 9, further comprising,
under first operating conditions, heating air that is delivered to the plurality of compartments, and
under second operating conditions, cooling air that is delivered to the plurality of compartments.

15. The thermal management method of claim 14, wherein the first and second operating conditions are based, at least in part, on a temperature of air communicated through at least one of the compartments.

16. The thermal management method of claim 15, wherein the temperature of air communicated through at least one of the compartments is monitored within the exhaust manifold.

* * * * *